United States Patent [19]

De Carle

[11] Patent Number: 4,890,913
[45] Date of Patent: Jan. 2, 1990

[54] ZONED MULTI-FOCAL CONTACT LENS

[76] Inventor: John T. De Carle, Lowicks House, Sandy Lane, Rusmoor, Tilford, Nr. Farnham, Surrey, United Kingdom

[21] Appl. No.: 113,244

[22] Filed: Oct. 26, 1987

Related U.S. Application Data

[63] Continuation-in-part of Ser. No. 541,454, Oct. 13, 1983, Pat. No. 4,704,016.

[51] Int. Cl.$^4$ .............................................. G02C 7/04
[52] U.S. Cl. ................................................... 351/161
[58] Field of Search ............... 351/160 R, 160 H, 161, 351/162

[56] References Cited

U.S. PATENT DOCUMENTS

| | | | |
|---|---|---|---|
| 3,037,425 | 6/1962 | De Carle | 351/161 |
| 3,794,414 | 2/1974 | Wesley | 351/161 |
| 4,162,122 | 7/1979 | Cohen | 351/161 |
| 4,338,005 | 7/1982 | Cohen | 351/161 |
| 4,340,283 | 7/1982 | Cohen | 351/161 |

FOREIGN PATENT DOCUMENTS 2086605 5/1982 United Kingdom ................ 351/161

OTHER PUBLICATIONS

Jenkins, F. A. and White, H. E., Fundamentals of Physical Optics; McGraw-Hill Book Company, Inc., (N.Y. & London, 1937).

Primary Examiner—Scott J. Sugarman
Attorney, Agent, or Firm—Wolf, Greenfield & Sacks

[57] ABSTRACT

Bifocal contact lenses are described wherein at least the major viewing area is divided into a plurality of near and distant viewing zones, each near vision zone being adjacent to a distant viewing zone and there being between about 2 and 8 zones of each power in said major viewing area, each zone being capable of operating as a lens independently of the other zones and wherein the relative areas of the zones are such that in use substantially equal amounts of light enter the eye through the near and distant vision zones.

6 Claims, 2 Drawing Sheets

ZONED MULTI-FOCAL CONTACT LENS

CROSS REFERENCE TO RELATED APPLICATIONS

This is a continuation-in-part of U.S. Ser. No. 06/541,454 filed 10-13-83 now U.S. Pat. No. 4,704,016.

FIELD OF THE INVENTION

This invention relates to contact lenses and in particular to bifocal and trifocal contact lenses.

Conventional bifocal contact lenses can be divided into two main types, i.e.

1. Concentric bifocals in which the distance vision zone is in the centre and the reading or near vision zone is a peripheral ring or toroid around the central area. Occasionally the zones are reversed.

2. Bifocals which resemble scaled-down spectacle bifocal lenses. These lens comprise two D-shaped segments, the lower segment being the near vision zone.

In the case of the first type, the size of the central zone is critical, particularly if the lens is fitted tightly to the cornea so that little movement occurs on blinking. The amount of light entering the eye from the distant and near vision zones must be approximately equal, otherwise vision will be biased towards either distance or reading. As the pupil diameter is not static but varies according to the brightness of the light, a compromise must be made in selecting the size of the central zone. This problem is made worse by the fact that the different in pupil size between the maximum and minimum varies from person to person.

Bifocal lenses of the second type generally have to be fitted slightly looser so that the lens can move over the cornea. In this case, when the wearer is looking straight ahead the line dividing the two segments is below the centre of the pupil, while for reading the opposite situation applies. Thus the location of the dividing line between the distance and reading zones is critical for satisfactory fitting of this type of lens. Although variations in pupil size are less important in the case of this type they can affect the result.

for these reasons a large measure of trial and error inevitably occurs in fitting bifocal lenses of both of the above types, and the practitioner therefore requires a very large inventory to cover all the necessary permutations.

DESCRIPTION OF THE PRIOR ART

It has been proposed in U.S. Pat. Nos. 4,340,283; 4,338,005 and 4,210,391 (all to Allen L. Cohen) to utilise multi-focal Fresnel zone plate designs in the construction. However, Cohen forms his zones on the front surface of the lens and the effective optical surface is modified to an unpredictable and variable extent by a tear layer of varying thickness on the front surface. Also, in order to obtain the diffraction phenonema required for such devices to work, very narrow zone widths are required.

SUMMARY OF THE INVENTION

A major object of this invention therefore is to provide bifocal lenses wherein pupil diameter and pupil fluctuations have little or no influence on the fitting of the lenses. In order to avoid unnecessary repetition the term "bifocal" is used in the following description and claims to include trifocal lenses, where the context admits.

According to one aspect of the present invention, there is provided a bifocal contact lens having concave and convex lens surfaces and wherein at least a central vision area is divided into a plurality of concentric zones, at least some of the concentric zones being formed in the concave lens surface, and alternate concentric zones having a steeper curvature than the adjacent zone whereby the concave lens surface has a stepped configuration and the lens has two focal lengths.

The alternate concentric zones can be regarded as a series of alternating near and distant vision zones and the curvatures of the posterior and anterior surfaces calculated on this basis. The sum of the areas of such distant vision zones should preferably be substantially equal to the sum of the areas of such near vision zones. for example, the ratio of the total distant vision areas to the total near vision areas will generally be in the range of from about 60:40 to 40:60.

It is unnecessary for the whole surface of the lens to be divided into zones of different powers since it is only the portion of the lens which covers the pupil at its maximum dilation which is normally used in vision correction. Thus, the portion of the surface of the lens which is formed in such concentric zones is normally restricted to an optically central part of the lens having a diameter of about 5 to 6 mms.

In most lenses in accordance with the invention there will be at least 2 of each type of vision zone (i.e. distant and near) and usually there will be more zones, e.g. 6 or 8 or more. Typically, a lens will be formed with 3 to 6 zones of each kind.

One way of ensuring that the amount of light transmitted through near vision zones is substantially equal to that transmitted through the distant vision zones is to construct the zones so that they are of substantially equal area. However, it is usually convenient (and better results are obtained in practice), to provide a central distant vision zone which is surrounded by concentric zones of alternating power and a final peripheral zone having a power which is suitable for near vision.

Instead of forming all the vision zones on the back surface of the lens, these may be distributed between the posterior and anterior surfaces. This may be advantageous when larger, near addition powers are required or for patients having a particularly aspherical cornea. Another advantage is that the individual zones may be wider, e.g. twice the width of zones formed only on the back, concave surface.

In constructing the concentric zones, the aim is to form the alternating steeper and flatter curves to a depth which is such that in use a continuous tear film exists between the cornea and the back of the lens. It has been found that provided the depth of the cuts in the back surface of the lens do not exceed about 0.05 mm, a generally continuous tear film will be maintained when the lens is worn.

The concentric zones, which have a steeper curvature, will fill with tear fluid and constitute a series of annular positive tear lenses between the plastics lens and the cornea. Since the difference in refractive index between most plastics materials and tear fluid is much less than between plastics and air, a partial neutralisation will occur. For most plastics, the refractive index is such that the power difference between the near and distance vision zones in air will be about three times the power difference in use with a tear film filling the steeper concentric zones. The calculation of the radius of curvature for the near vision zones can be readily calculated once the refractive index of the plastic lens material is known.

The most convenient method of producing individual lenses in accordance with the invention is by machining. Computer-controlled lathes exist which are capable of repetitively following a complex series of machining movements. however, for larger scale production, moulding or a combination of moulding and machining is preferred.

BRIEF DESCRIPTION OF THE DRAWINGS

Various embodiments of bifocal lenses in accordance with the invention will now be described by way of illustration only, with reference to the accompanying drawings in which.

DESCRIPTION OF THE PREFERRED EMBODIMENT

Figure 1:
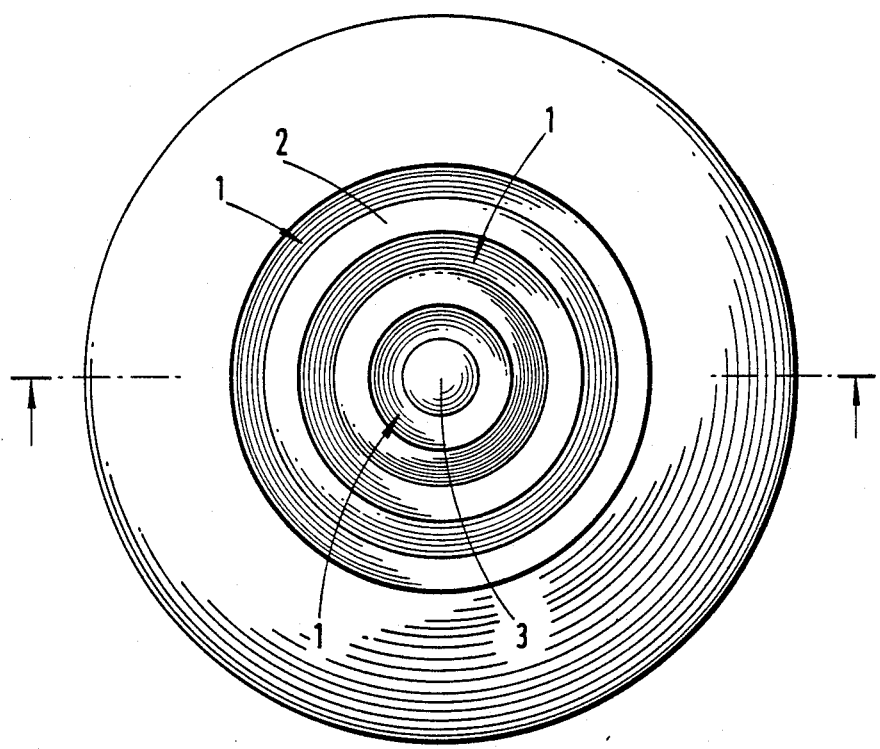
FIG. 1 is a front plan view of one embodiment of a bifocal contact lens.
Figure 2:
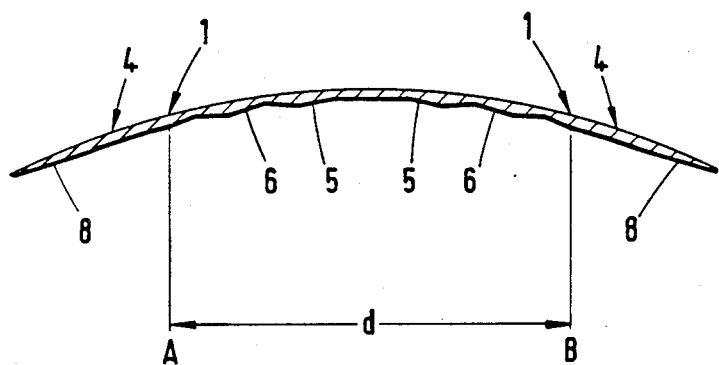
FIG. 2 is a cross section through the centre of the lens shown in FIG. 1.
Figure 1A:
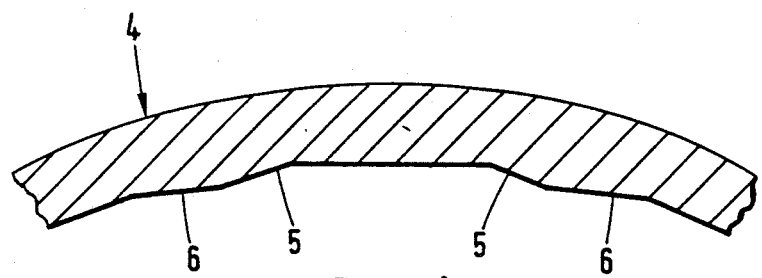
FIG. 1A is a partial transverse section through the central section of the lens shown in FIG. 1.

In FIGS. 1, 1A & 2 a lens is shown having near and distant viewing zones formed as a series of concentric rings in the back surface of the lens.

The shaded rings 1 in FIG. 1 denote the near vision viewing zones while the unshaded rings 2 denote the distant vision zones. Of course, in reality, the rings 1 and 2 are equally transparent. These roles can however be reversed. As illustrated the central area 3 of the lens has a focal length which is appropriate for distant viewing while the adjacent zone 1 has a focal length appropriate for near vision viewing. The outermost zone 1 may extend to the perimeter of the lens but, of course, the portion beyond the normal extent of the pupil diameter is not effective in vision correction. A lens of this kind can be manufactured on a lens lathe by machining the entire power curve 4 initially for reading viewing and then taking a series of steeper cuts 5 and 6 (see FIGS. 1 and 2) to produce zones 2 for distance vision viewing between annular zones 1 for near vision. The sharp steps produced by the cuts 5,6 can be avoided by continually changing the position of the centre of curvature when moving the cutting tool in a controlled manner to produce a smooth transition between the different curvatures of the alternating zones.

As can be seen best from FIG. 2, the lens has a near vision zone 1 which extends outside the central area indicated by the region A-B, which represents the normal pupil opening in average lighting conditions. The base curve of the lens is flattened slightly at the periphery 8 so that the lens is fitted to the eyeball essentially at the periphery. The base curvature at the periphery differs by about 0.5 to 1 mm from the base curve radius in the reading zones so as to ensure that a tear film is maintained between the lens and the cornea in the viewing zones covered by the region A to B. A difference in radius of curvature between the near vision and distant vision zones of from about 0.5 to 1 mm is also usually satisfactory.

When manufacturing hard lenses, typical materials are polymethyl methyacrylate and copolymers thereof, polyesters and polymers and copolymers of styrene and gas-permeable polymer materials e.g. silicone-alkyl methacrylate copolymers (such as described in U.S. Pat. Nos. 3,808,179 and 4,120,570) and copolymers of organo-silicon monomers and fluoro methacrylate monomers (e.g. PCT WO 86/0434). Polyesters and polymers containing styrene have a higher refractive index than polymethacrylates or polyacrylates.

Referring again to FIG. 2, the diameter 'd' of the region A and B is typically about 5 to 6 mm., while the overall diameter will be about 9 to 10 mm. for a hard lens or about 13 to 14 mm for a soft lens. With a typical closeness of fitting, the lens will tend to move over a distance of about 2 mm. Since pupil diameter when fully dilated is about 4 mm, the pupil area will remain covered at all times by the area defined by the zones. Because substantially equal amounts of light reach the pupil through the zones 1 and the zones 2 over substantially the whole of this area fitting of the lens becomes independent of the pupil size and fluctuations in pupil size with different light conditions.

Figure 1B:
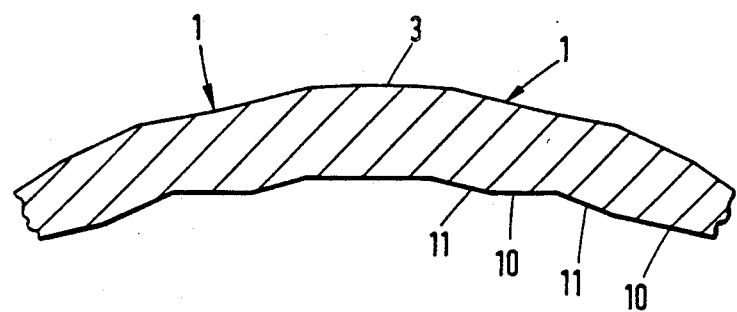
FIG. 1B is a view similar to FIG. 1A of a second embodiment in which concentric zones are also found on the front surface of the lens.

Referring specifically to FIG. 1B, this differs from the embodiment of FIGS. 1, 1A and 2 in as much as concentric zones are formed on both the convex and concave surfaces. Thus, the lens has a central distant vision zone 3 and a series of alternating concentric zones 1 of steeper curvature than that of zone 3. These zones provide areas for near vision viewing. On the inside surface of the lens, a series of concentric zones 10 and 11 are formed, the zones 11 having a steeper curvature than zones 10. As can be seen, zones 11 overlap the junctions on the front surface between zones 1. Thus, zones 11 provide the distant vision zones.

While casting and machining are the preferred methods of producing lenses in accordance with the invention, it may be possible to utilize injection or compression moulding techniques.

Lenses manufactured in accordance with the invention may be hard or soft and produced by polymerisation of the known monomer mixtures. In the case of soft lenses, the lenses are machined in hard conditions and, after shaping and polishing, swollen in the usual isotonic swelling solutions. When manufacturing by moulding, a degassed polymerisation mixture is poured into a suitably shaped mould half, the mould is closed with the other mould half and the mixture maintained at a controlled temperature or temperature cycle usually between 40° C. and 100° C., until polymerisation is substantially complete. The castings are removed from the moulds, polished (if necessary) and swollen in an appropriate aqueous solution e.g. isotonic saline. A variety of polymerisation recipes are possible, for example, as described in British Patents Nos. 1,385,677 and 1,475,605 (De Carle), 829,565 (Wichterle) and 1,436,705 (N.R.D.C.), the disclosure of which is specifically imported herein.

It is a surprising feature of the lenses of the present invention that although the wearer will actually be able to look through two or more zones of different focal lengths at the same time, after a short acclimatisation period, the wearer learns to discriminate between the images and to ignore the images which are out of focus. After a while, the wearer is no longer conscious that he is seeing several images but is only aware of the one which is in focus, for the particular object or view he is looking at. This situation is achieved so long as the relative zones of distant and near vision (or distant, middle and near vision) portions of the lens are essentially in balance. Thus for a bifocal lens I aim to have approximately half the total viewed area each for distant and near vision. It is however possible to depart somewhat from the 50/50 situation and, for example, provide zones in the relative proportion of 60/40 or 40/60. Also it may be preferable not to distribute the areas entirely uniformly and perhaps provide a greater area of reading vision towards the periphery of the lens.

I claim:

1. A contact lens having an anterior convex and a posterior concave lens surface comprising:

a central viewing portion which has an area larger than the maximum pupil size of the wearer and has a posterior surface spaced no more than 0.05 mm from the anterior surface of the cornea of the wearer which is adapted to contain a continuous layer of tear fluid between said cornea and said central viewing portion, said central viewing portion including a central refractive circular zone having a first focal length surrounded by a plurality of annular concentric refractive zones which alternate between a second focal length and said first focal length as they extend outwardly from said central zone, said zones being formed by variations in the curvature of the posterior concave surface of said central viewing portion, there being between about 2 and 8 zones of each focal length located in said central viewing portion such that the ratio of the total area of said zones of said first focal length to the total area of said zones of said second focal length is about 60:40, and, a peripheral lens portion having a posterior curvature corresponding to the anterior curvature of the cornea of the wearer, said peripheral portion adapted to float upon the cornea of the wearer's eye adjacent its pupil.

2. The contact lens according to claim 1 in which the portions of the posterior surface of said central viewing area forming the zones of said first focal length are blended into the curvature of the alternate zones so as to form a smooth junction between adjacent zones without any sharp discontinuities.

3. The contact lens according to claim 1 wherein the difference between the first and second focal lengths is such that the lens has two powers, one being about 2 to 2.5 diopters greater than the other.

4. The contact lens of claim 1, wherein said first focal length is appropriate for distant vision and said second focal length is appropriate for near vision, and wherein said concentric annular zones are of substantially equal width.

5. The contact lens of claim 1, wherein said zones are formed by variations in the curvature of both the concave posterior and the convex anterior surfaces of said central viewing portion, said variations in said surfaces being offset relative to each other.

6. The contact lens of claim 1, wherein the focal length of said peripheral lens portion is substantially the same as the focal length of one of said zones.

* * * * *